United States Patent
Scharp et al.

(10) Patent No.: US 10,920,886 B2
(45) Date of Patent: Feb. 16, 2021

(54) PISTON OF AN INTERNAL COMBUSTION ENGINE

(71) Applicant: Mahle International GmbH, Stuttgart (DE)

(72) Inventors: Rainer Scharp, Vaihingen (DE); Kai Schreer, Wiernsheim (DE)

(73) Assignee: Mahle International GmbH

( * ) Notice: Subject to any disclaimer, the term of this patent is extended or adjusted under 35 U.S.C. 154(b) by 0 days.

(21) Appl. No.: 16/559,751

(22) Filed: Sep. 4, 2019

(65) Prior Publication Data
US 2020/0132193 A1 Apr. 30, 2020

(30) Foreign Application Priority Data
Sep. 5, 2018 (DE) ...................... 10 2018 215 092.3

(51) Int. Cl.
*F16J 9/22* (2006.01)
*F02F 3/00* (2006.01)
*F16J 1/00* (2006.01)
*F16J 1/08* (2006.01)

(52) U.S. Cl.
CPC ................. *F16J 9/22* (2013.01); *F16J 1/008* (2013.01); *F16J 1/08* (2013.01); *F02F 3/00* (2013.01)

(58) Field of Classification Search
CPC ....................................... F16J 9/20; F16J 9/22
USPC ...... 277/450, 452, 453, 454, 455, FOR. 172, 277/FOR. 173, FOR. 174, FOR. 175, 277/FOR. 176
See application file for complete search history.

(56) References Cited

U.S. PATENT DOCUMENTS

| 1,545,275 | A | * | 7/1925 | Panyard | F16J 9/20 |
| | | | | | 277/450 |
| 1,862,983 | A | * | 6/1932 | Roberts | F16J 9/20 |
| | | | | | 277/454 |
| 2,051,101 | A | * | 8/1936 | McKee | F16J 9/20 |
| | | | | | 92/127 |
| 3,759,148 | A | | 9/1973 | Geffroy | |
| 5,265,565 | A | * | 11/1993 | Bando | F16J 9/00 |
| | | | | | 123/193.4 |

(Continued)

FOREIGN PATENT DOCUMENTS

| CH | 169134 A | * | 5/1934 |
| DE | 1601388 A1 | | 10/1970 |

(Continued)

OTHER PUBLICATIONS

CH 169134 machine translation to English from espacenet (Year: 1934).*

(Continued)

*Primary Examiner* — Michael Leslie
*Assistant Examiner* — Michael Quandt
(74) *Attorney, Agent, or Firm* — Fishman Stewart PLLC

(57) ABSTRACT

A piston of an internal combustion engine includes a piston head including a ring belt having a firing land and a plurality of ring grooves for receiving piston rings. A first ring groove of the plurality of ring grooves that is arranged directly adjacent to the firing land has a ring groove axis that runs coaxially to a piston axis of the piston. The first ring groove has an upper groove flank and a lower groove flank arranged away from the firing land relative to the upper groove flank. At least the lower groove flank of at least the first ring groove is inclined by an inclination angle with respect to an orthogonal plane relative to the piston axis, and the inclination angle of at least the lower groove flank varies in a circumferential direction of the piston axis.

19 Claims, 1 Drawing Sheet

(56) References Cited

U.S. PATENT DOCUMENTS

| | | | | |
|---|---|---|---|---|
| 7,614,339 | B2* | 11/2009 | Fisher | F01M 9/00 |
| | | | | 92/159 |
| 7,931,003 | B2* | 4/2011 | Bando | F16J 9/00 |
| | | | | 123/193.4 |
| 10,167,954 | B2 | 1/2019 | Meier | |
| 2005/0028779 | A1 | 2/2005 | Tomanik et al. | |
| 2006/0266322 | A1* | 11/2006 | Tomanik | F02F 3/00 |
| | | | | 123/193.4 |
| 2008/0148933 | A1 | 6/2008 | Fisher et al. | |

FOREIGN PATENT DOCUMENTS

| | | |
|---|---|---|
| DE | 60216631 T2 | 9/2007 |
| DE | 102007061124 A1 | 7/2008 |
| DE | 102008028052 A1 | 1/2010 |
| DE | 102009032940 A1 | 1/2011 |
| EP | 1448918 B1 | 12/2006 |
| JP | H08-121242 A | 5/1996 |
| JP | 2018-112275 A | 7/2018 |
| WO | 2009/066400 A1 | 5/2009 |
| WO | 2010055611 A1 | 5/2010 |

OTHER PUBLICATIONS

DE 102009032940 machine translation to English from espacenet (Year: 2011).*
German Search Report dated Apr. 15, 2019 related to corresponding German Patent Application No. 10 2018 215 092.3.

* cited by examiner

PISTON OF AN INTERNAL COMBUSTION ENGINE

CROSS-REFERENCE TO RELATED APPLICATION

This application claims priority to German Application No. DE 10 2018 215 092.3 filed on Sep. 5, 2018, the contents of which are hereby incorporated by reference in its entirety.

TECHNICAL FILED

The present invention relates to a piston of an internal combustion engine having a piston head with a ring belt with a firing land and ring grooves for receiving piston rings. Moreover, the invention relates to an internal combustion engine having at least one piston of this type.

BACKGROUND

Pistons of an internal combustion engine have a high load on account of an inhomogeneous thermal expansion between the piston head and the piston skirt, in particular, on a first piston ring which is directly adjacent with respect to a firing land and is arranged in an associated first ring groove. In addition, the gas pressure load which comes from a combustion chamber also acts on the first piston ring. As a result of the inhomogeneous thermal expansion and the gas pressure load which acts, the piston and, with it, also the ring grooves are deformed, with the result that their cross-sectional shape changes and no longer fits the shape of the piston ring, which impairs the sealing action and increases the oil consumption of the internal combustion engine.

In order to counteract this, for example, DE 10 2008 028 052 A1 has disclosed designing at least one groove flank of a ring groove and/or a cross section of a piston ring in such a way that, at least in the case of a piston which is deformed during operation under the action of heat, a starting contact between an underside of the piston ring and an opposite lower supporting face of the piston ring groove begins at least in a region of the underside of the piston ring, which region faces a piston axis.

EP 1 448 918 B1 has likewise disclosed a piston for an internal combustion engine with circumferential ring grooves for receiving piston rings, at least one first upper groove having a profile with an upper side wall and a lower side wall which are inclined radially to the outside in the direction of the piston upper side at an inclination angle of approximately from 50 to 30 angular minutes, with the result that, under an operating state with a critical relatively high load, the lower side wall of the upper groove is situated in a plane which lies substantially perpendicularly with respect to the longitudinal axis of the piston. As a result, it is intended to be possible for thermally and mechanically caused downward deformations which the piston is subjected to in an operating state with a relatively high load to be compensated for at least partially.

DE 10 2009 032 940 A1 has disclosed a piston with a piston crown, on the ring belt of which ring grooves for receiving piston rings are provided. Here, a circumferential line of at least one piston ring or a circumferential line of the ring groove which receives the at least one piston ring has at least one maximum and at least one minimum in an alternating manner distributed uniformly around the circumference in comparison with a plane which runs parallel to the piston crown. As a result, an axial freedom of movement of the piston ring which is received in the ring groove is to be minimized and therefore what is known as fluttering thereof is to be prevented in as simple a way as possible.

On account of the circumstance that a piston generally becomes hotter on its side which faces the combustion chamber than on the side which faces the crankcase, the resulting thermal expansion frequently also brings about a deformation of the ring belt.

SUMMARY

The present invention is therefore concerned with the problem of specifying an improved or at least an alternative embodiment for a piston of the generic type, which embodiment avoids, in particular, the disadvantages which are known from the state of the art.

According to the invention, the said problem is solved by way of the subject matter of the independent claim(s). Advantageous embodiments are the subject matter of the dependent claims.

The present invention is based on the general concept of inclining at least one groove flank of a ring groove which is directly adjacent with respect to a firing land of a piston with respect to an orthogonal with respect to the piston axis, and in the process to vary the inclination in the circumferential direction. Here, the ring groove has a ring groove axis which runs coaxially, that is to say identically, with respect to a piston axis. As a result, it can be achieved that a piston ring which is received in the said ring groove is given an approximately ideal, that is to say rotationally symmetrical, contact on the groove flank and is therefore supported in an optimum manner as a result during operation of an internal combustion engine, that is to say in the loaded state, as a result of which, in particular, an oil consumption of an internal combustion engine of this type can be reduced. The envisaged ideal form of the contact face of the groove flank can be planar or conical, depending on whether, for example, a rectangular ring or a trapezoidal ring is used. A certain flank inclination can also be desired, however, in the case of rectangular rings, in order to influence the contact behaviour of the ring. It is essential to the invention, however, that the ring groove or at least its lower groove flank runs approximately rotationally symmetrically in the hot operating state, that is to say has constant inclination angles of the groove flank over the entire circumference. The deformation behaviour during operation can be compensated for at least partially by way of a non-rotationally symmetrical design of the ring groove in the cold state, in order to come closer to the desired shape.

Since a typical piston is not rotationally symmetrical with respect to the piston axis, but is frequently approximately plane-symmetrical with respect to the plane comprising the piston axis and the pin axis and with respect to the central plane perpendicularly with respect to the pin axis, it has different flexural rigidities in the pin direction and transversely with respect thereto. The fact that the piston flexes to a different extent in the pin direction and in the pressure/counterpressure direction leads at operating temperature to a non-rotationally symmetrical deformation which is typically repeated every 180° in the circumferential direction, that is to say has two peaks and two troughs on the circumference, which can lead to leaks and an increased oil consumption precisely in the region of the ring grooves. This effect is also influenced by way of the likewise inhomogeneous deformation as a result of the gas pressure load and as a result of shape-dependent heat transfer properties, cooling and temperature distribution.

Here, the piston according to the invention has a piston head with a ring belt and a firing land and ring grooves which are arranged below the firing land for receiving piston rings, a first ring groove being arranged directly adjacently with respect to the firing land, and having an upper groove flank and a lower groove flank. Here, according to the invention, at least the lower groove flank of the first ring groove is inclined by an inclination angle $\alpha$ with respect to the orthogonal with respect to the piston axis, the inclination angle $\alpha$ of at least the lower groove flank of the first ring groove varying in the circumferential direction. A non-rotationally symmetrical deformation behaviour of the piston can be compensated for in an improved manner as a result, it being possible for the said compensation to relate to not only mechanical loads, but rather also thermal loads, such as a different thermal conductivity and/or a different temperature distribution in different radial directions of the piston. It goes without saying that it is clear here that the inclination according to the invention of the lower groove flank, which inclination varies in the circumferential direction, can be provided not only in the region of the first ring groove, that is to say the ring groove which is directly adjacent with respect to the firing land, but it goes without saying that it can also be provided on other ring grooves. The first ring groove which is directly adjacent with respect to the firing land and the piston ring which is arranged therein are the most important, however, for the reduction of the oil consumption.

In the case of one advantageous development of the solution according to the invention, the upper groove flank of at least the first ring groove is inclined by an inclination angle $\alpha$ with respect to an orthogonal with respect to the piston axis, the inclination angle $\alpha$ of the upper groove flank varying in the circumferential direction. It has been shown that not only the variations of the inclination angles $\alpha$ over the circumference in the region of the lower groove flank are advantageous, but rather they are also advantageous in a similar way in the region of the upper groove flank, since the piston moves up and down during operation and, as a result, the respective piston ring bears against the upper groove flank in the case of the one movement and bears against the opposite lower groove flank in the case of the other movement.

In the case of a further advantageous embodiment of the solution according to the invention, at least the lower groove flank of at least the first ring groove has two corrugation peaks and two corrugation troughs in the circumferential direction. Here, the corrugation peaks can have an inclination angle $\alpha$ of approximately 0°, whereas the corrugation troughs can have an inclination angle $\alpha$ of up to 1° in relation to the orthogonal with respect to the piston axis. Here, the inclination angle $\alpha$ is determined between the orthogonal, that is to say the radial with respect to the piston axis, and a straight line which is laid on the groove flank, the said straight line being defined between a transition of a groove bottom to the relevant groove flank and a transition from the groove flank to an outer circumferential face. Here, the corrugation troughs lie orthogonally with respect to a pin axis, whereas the corrugation peaks are arranged parallel to the pin axis.

In the case of a further advantageous embodiment of the solution according to the invention, an inclination angle $\alpha$ with respect to the orthogonal with respect to the piston axis lies in a range of ±1°. It is therefore conceivable that at least the lower groove flank of at least the first ring groove falls or rises towards the outside. In the case of an outwardly falling lower groove flank, the advantage is afforded that the associated piston ring which is received in the ring groove lies on its inner edge during operation of the internal combustion engine and bears uniformly in a flat manner on the respective groove flank under gas pressure load and, as a result, presses oil out of the groove in the direction of the cylinder wall. This contributes to the reduction of the oil consumption. In contrast, an outwardly rising lower groove flank affords the possibility of compensating for the thermal and mechanical deformation of the piston during operation, by a "peak" of this type being provided in the lower groove flank above the boss in the pin direction, for example. Depending on the piston geometry, the direction of the more pronounced thermal expansion can also be expected transversely with respect to the pin, however, with the result that the lower groove flank which rises outwards in the cold state preferably has its maximum gradient in the region of the skirt.

A lower groove flank can have a location, at which the inclination angle $\alpha=0°$. This is conceivable, for example, in the region of a corrugation peak or corrugation trough. On account of the pronounced thermal expansion in the region of the piston crown, however, the groove flanks are frequently inclined in the case of a temperature rise both in the pin axis and also transversely with respect thereto downwards, even if to a different extent. One embodiment is preferred, in the case of which the lower groove flanks are inclined in the cold state at least in the surroundings of the pin axis, or else are inclined so as to rise slightly to the outside over the entire circumference. This preferably results in the hot state in a lower groove flank which is from planar to falling slightly outwards (for example, from 0° to 0.5°). In the case of non-rectangular piston rings, the observations relate to relative angles, that is to say the deviations of the groove flank inclination from the associated ring flank inclination, for example of in each case 7.5° at the top and bottom in the case of a symmetrical 15° trapezoidal ring.

In the case of a further advantageous embodiment of the solution according to the invention, at least one lower groove flank is corrugated in the circumferential direction. Depending on the embodiment, a corrugation of this type in the circumferential direction can provide further improved contact for the associated piston ring and therefore a further increased sealing action. In addition or as an alternative, it is also conceivable that at least one lower groove flank is curved, that is to say non-planar, at least in regions. In this case, the inclination of the associated groove flank is determined by way of a straight line which is defined by way of two points, the first point of the straight line lying at the transition of the groove flank to the outer circumferential face of the piston, whereas the second point lies at the transition of the groove flank to the groove bottom. Here, in particular, a convex curvature of the groove flank comes into question which, however, is extremely small, in order for it to be possible for contact of the piston ring on the groove flank in as flat a manner as possible to be enabled.

Furthermore, the present invention is based on the general concept of equipping an internal combustion engine with at least one piston of this type and, as a result, of considerably reducing the oil consumption of the internal combustion engine.

Further important features and advantages of the invention result from the subclaims, from the drawings and from the associated description of the figures on the basis of the drawings.

It goes without saying that the features which are mentioned in the above text and are still to be described in the following text can be used not only in the respective specified combination, but rather also in other combinations or on their own, without departing from the scope of the present invention.

Preferred exemplary embodiments of the invention are shown in the drawings and will be described in greater detail in the following description, identical reference numerals relating to identical or similar or functionally identical components.

DETAILED DESCRIPTION

Figure 1:
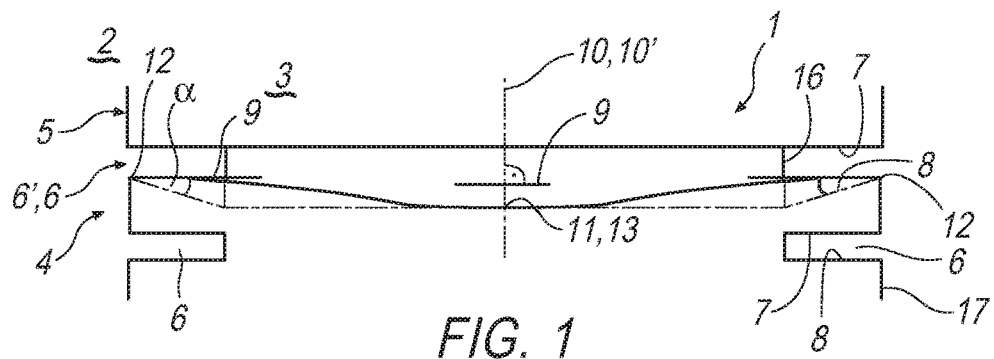
FIG. 1 shows a piston according to the invention of an internal combustion engine in the region of a ring belt of a piston head with an outwardly rising lower groove flank.
Figure 2:
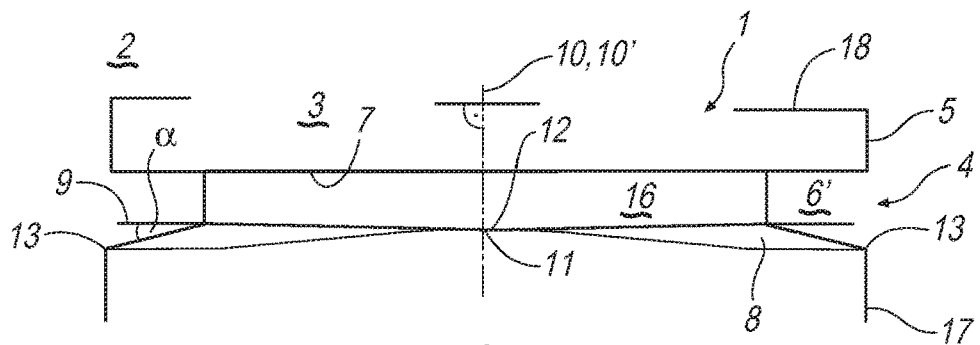
FIG. 2 shows an illustration as in FIG. 1, but with an outwardly falling lower groove flank.
Figure 3:
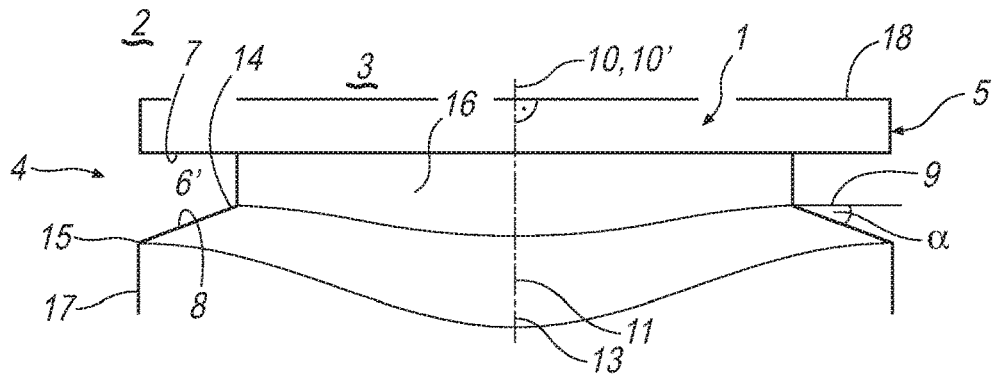
FIG. 3 shows an illustration as in FIG. 2, but with an additionally corrugated course of the lower groove flank.

In accordance with FIGS. 1 to 3, a piston 1 according to the invention of an internal combustion engine 2 which is otherwise not shown has a piston head 3 with a ring belt 4 with a firing land 5 and at least one ring groove 6, 6' for receiving a piston ring (not shown). Here, a first ring groove 6' is arranged directly adjacently with respect to the firing land 5, and has an upper groove flank 7 and a lower groove flank 8.

Here, at least one ring groove 6, 6' is of radially circumferential configuration with a radius which runs orthogonally with respect to the piston axis 10. The ring groove 6, 6' therefore lies at least substantially in a plane which runs orthogonally with respect to the piston axis 10. A groove bottom 16 usually runs parallel to the piston axis 10. The ring groove 6, 6' also usually runs parallel to a piston crown 18. Here, at least two, preferably all, ring grooves 6, 6' run parallel to one another and parallel to the piston crown 18.

At least the first ring groove 6' has a ring groove axis 10' which runs coaxially, that is to say identically, with respect to the piston axis 10.

According to the invention, at least the lower groove flank 8 of the ring groove 6' which is directly adjacent with respect to the firing land 5, that is to say of the first ring groove 6', is then inclined by an inclination angle α with respect to an orthogonal 9 with respect to the piston axis 10, the inclination of at least the lower groove flank 8 varying in the circumferential direction. An optimum compensation of a thermal/mechanical load can be achieved by way of the variation of the inclination in the circumferential direction, that is to say by way of the variation of the inclination angle α of the groove flank 8. As a result, it is possible, in particular, to compensate for non-rotationally symmetrical deformations of the piston 1 during operation, in particular also on account of a differing flexural stiffness in the orthogonal direction, thermal conductivity, cooling and/or temperature distribution. By way of the variation of the inclination, that is to say of the inclination angle α as viewed over the circumference, moreover, considerably improved contact of a piston ring which is arranged in at least the first ring groove 6' can be achieved, as a result of which the said piston ring can be supported in an improved manner and, as a result, slides in an improved manner along the cylinder wall and, as a result, contributes to reducing an oil consumption of the internal combustion engine 2. As a result of the inclination angle α which varies in the circumferential direction, a conical bearing face for the piston ring can be provided together with the non-rotationally symmetrical deformations of the piston 1 during operation, the said conical bearing face, that is to say the lower groove flank 8 in the present case, providing flat, homogeneous contact for the piston ring.

In the case of the pistons 1 which are shown in accordance with FIGS. 1 to 3, a pin axis runs perpendicularly with respect to the piston axis 10 and perpendicularly with respect to the orthogonal 9, that is to say perpendicularly with respect to the plane of the drawing in the present case.

If the first ring groove 6' in accordance with FIG. 1 is considered further, it can be seen that the lower groove flank 8 thereof rises on the right and on the left to the outside, whereas it is horizontal in the region of a location 11, that is to say is parallel to the pin axis. At the said location 11, the inclination angle is therefore α=0°.

In accordance with FIG. 2, a piston 1 is shown, in the case of which the lower groove flank 8 of the first ring groove 6', that is to say of the ring groove 6' which is directly adjacent with respect to the firing land 5, falls radially to the outside and likewise varies over the circumference with regard to its inclination angle α. The said inclination angle α is thus at its greatest on the right and on the left between the orthogonal 9 with respect to the piston axis 10, and corresponds to an inclination angle α of 0° at the location 11, with the result that the lower groove flank 8 is parallel to the orthogonal 9 in the said region.

Figure 4:
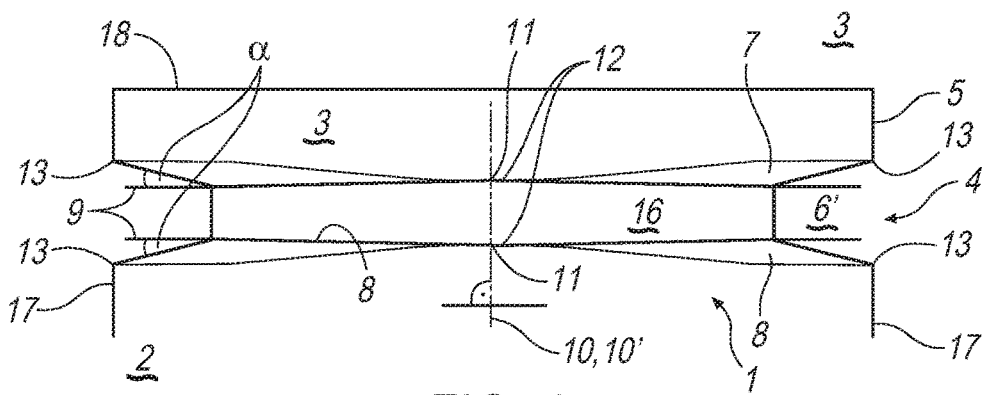
FIG. 4 shows a piston according to another example in the region of the ring belt with an upper groove flank that is inclined by an inclination angle that varies in the circumferential direction.

Many further embodiments are not shown but are advantageous, which further embodiments compensate for the measurable thermal expansion behaviour of a certain piston. Thus, the rising (FIG. 1) or falling (FIG. 2) lower groove flank 8 can advantageously also run in an inclined manner over the full circumference, without reaching the value zero anywhere, the inclination angle α varying between a maximum and minimum value. This case can result by way of thermal expansions alone, but is also present when, for example, a considerable basic inclination of the groove flank is predefined by way of a trapezoidal ring, which basic inclination varies according to the invention only to a relatively small extent. It would also be possible, however, that the inclination changes its sign in the circumferential direction, that is to say, for example, is of rising configuration along the pin axis as in FIG. 1, but is of falling configuration transversely with respect to the said pin axis as in FIG. 2. Furthermore, the grooves according to FIGS. 1-3 and the described modifications might also be realised in relation to the pin axis in the plane of the drawing, instead of perpendicularly with respect thereto. It is conceivable, furthermore, that the upper groove flank 7 of at least the first ring groove 6' (see FIG. 4), but also the lower and/or upper flanks of further ring groove 6 (cf. FIG. 1) are inclined by an inclination angle α with respect to the orthogonal 9 with respect to the piston axis 10, the inclination of the upper groove flank 7 likewise varying in the circumferential direction. In the same way, the groove flanks 7, 8 with inclination angles α which vary over the circumference can also be used in further ring grooves 6.

If FIGS. 1 to 3 are considered further, it can be seen that at least the lower groove flank 8 has two corrugation peaks 12 and two corrugation troughs 13 in the circumferential direction. Here, according to FIGS. 1 and 3, a corrugation trough 13 is arranged in the region of the location 11, whereas, according to FIG. 2, a corrugation peak 12 is arranged at the location 11. In general, the inclination angle α with respect to the orthogonal 9 with respect to the piston axis 10 can lie in a range between −1°≤α≤+1°, it being possible for manufacturing tolerances of from 5 to 10 angular minutes to occur.

If the lower groove flank 8 of the first ring groove 6' according to FIG. 3 is considered, it can be seen there that the lower groove flank 8 is corrugated in the circumferential direction. It is not only the angle inclination a of the lower groove flank 8 which varies in the circumferential direction, but rather also the lower edge of the groove bottom 16 runs in a corrugated manner in the axial direction. Once again, two maxima and two minima per 360° are preferably caused by the typical piston geometry. They preferably lie along the pin axis or perpendicularly with respect thereto or vice versa. Other deformations of the piston 1 and therefore also of the lower groove flank 8 which occur during operation of the internal combustion engine 2 can be compensated for via a corrugated course of this type. As a result, a better contact face for a piston ring can be provided than would be possible solely by way of variation of the flank inclination a. The corrugation according to FIG. 3 can also be combined with the described variants of the groove flank 8 which are shown in FIGS. 1 and 2 and build on the former, and can also be applied to upper groove flanks 7 or further groove flanks 6.

Here, at least the lower groove flank 8 can also be curved at least in regions; in particular, a convex curvature is to be preferred, the inclination angle α being defined in this case by way of the orthogonal 9 and a straight line which goes through two points, namely a transition 14 from a groove flank 80 to a groove bottom 16 and a transition 15 from the lower groove flank 8 to an outer circumferential face 17.

In general, the embodiment according to the invention of at least the lower groove flank 8 of at least the first ring groove 6' can achieve a situation where operationally induced and temperature-induced deformations of the piston 1 can be compensated for in an improved manner and, as a result, an improved support of the piston ring can be achieved, as a result of which the oil consumption of the internal combustion engine 2 can be reduced.

The invention claimed is:

1. A piston of an internal combustion engine, comprising:
a piston head including a ring belt having a firing land and a plurality of ring grooves for receiving piston rings;
a first ring groove of the plurality of ring grooves arranged directly adjacent to the firing land, and having an upper groove flank and a lower groove flank arranged away from the firing land relative to the upper groove flank;
at least the first ring groove having a ring groove axis that runs coaxially to a piston axis;
wherein at least the lower groove flank of at least the first ring groove is inclined radially outwards by an inclination angle with respect to an orthogonal plane relative to the piston axis; and
wherein the inclination angle of at least the lower groove flank varies in a circumferential direction of the piston axis.

2. The piston according to claim 1, wherein the upper groove flank of at least the first ring groove is inclined by a further inclination angle with respect to the orthogonal plane, and wherein the further inclination angle of at least the upper groove flank varies in the circumferential direction.

3. The piston according to claim 1, wherein the inclination angle of the lower groove flank has at least two maxima and at least two minima in the circumferential direction.

4. The piston according to claim 1, wherein the inclination angle of the lower groove flank lies in a range −1°≤α≤+1°.

5. The piston according to claim 4, wherein at least the lower groove flank rises or falls radially outwardly from the piston axis.

6. The piston according to claim 4, wherein the lower groove flank rises toward the firing land in a radially outward direction, and wherein the lower groove flank has a further location in the circumferential direction at which the inclination angle is α=0°.

7. The piston according to claim 4, wherein the lower groove flank falls away from the firing land in a radially outward direction, and wherein the lower groove flank has a further location in the circumferential direction at which the inclination angle is α=0°.

8. The piston according to claim 1, wherein at least the lower groove flank of the first ring groove has a location, at which the inclination angle is α=0°.

9. The piston according to claim 1, wherein at least the lower groove flank of the first ring groove is corrugated in the circumferential direction.

10. The piston according to claim 9, wherein the lower groove flank has at least two corrugation peaks and at least two corrugation troughs in the circumferential direction.

11. The piston according to claim 1, wherein the lower groove flank extends inclined to the orthogonal plane over a full circumference of the first ring groove, and wherein the inclination angle of the lower groove flank varies between a maximum value and a minimum value in the circumferential direction.

12. An internal combustion engine, comprising: at least one piston having a piston axis, the at least one piston including:
a piston head including a ring belt having a firing land and a plurality of ring grooves for receiving piston rings;
the plurality of ring grooves including a first ring groove arranged directly adjacent to the firing land and having a ring groove axis disposed coaxially to the piston axis; and
the first ring groove having an upper groove flank and a lower groove flank arranged away from the firing land relative to the upper groove flank;
wherein at least the lower groove flank of the first ring groove is inclined radially outwards by an inclination angle with respect to an orthogonal plane relative to the piston axis, and wherein the inclination angle of the lower groove flank varies in a circumferential direction of the piston axis.

13. The internal combustion engine according to claim 12, wherein the upper groove flank of the first ring groove is inclined by a further inclination angle with respect to the orthogonal plane, and wherein the further inclination angle of the upper groove flank varies in the circumferential direction.

14. The internal combustion engine according to claim 13, wherein at least one of the inclination angle of the lower groove flank and the further inclination angle of the upper groove flank lies in a range of ±1° with respect to the orthogonal plane.

15. The internal combustion engine according to claim 13, wherein at least one of the lower groove flank and the upper groove flank rises or falls radially outwardly from the piston axis.

16. The internal combustion engine according to claim 12, wherein the inclination angle of the lower groove flank has two maxima and two minima in the circumferential direction.

17. The internal combustion engine according to claim 16, wherein the inclination angle of the lower groove flank is in a range of $-1° \leq \alpha \leq +1°$.

18. The internal combustion engine according to claim 12, wherein the lower groove flank has a location which the inclination angle is $\alpha=0°$.

19. The internal combustion engine according to claim 12, wherein the lower groove flank is corrugated in the circumferential direction.

* * * * *